United States Patent
Yi et al.

(10) Patent No.: US 10,785,690 B2
(45) Date of Patent: *Sep. 22, 2020

(54) METHOD FOR PERFORMING A CELL CHANGE PROCEDURE IN A WIRELESS COMMUNICATION SYSTEM AND A DEVICE THEREFOR

(71) Applicant: LG Electronics Inc., Seoul (KR)

(72) Inventors: Seungjune Yi, Seoul (KR); Sunyoung Lee, Seoul (KR); Youngdae Lee, Seoul (KR); Sungjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

This patent is subject to a terminal disclaimer.

(21) Appl. No.: 16/059,574

(22) Filed: Aug. 9, 2018

(65) Prior Publication Data

US 2018/0376386 A1    Dec. 27, 2018

Related U.S. Application Data

(63) Continuation of application No. 14/771,385, filed as application No. PCT/KR2014/002270 on Mar. 18, 2014, now Pat. No. 10,075,881.

(Continued)

(51) Int. Cl.
*H04W 36/00* (2009.01)
*H04W 36/04* (2009.01)
*H04W 36/08* (2009.01)

(52) U.S. Cl.
CPC ... *H04W 36/0061* (2013.01); *H04W 36/0072* (2013.01); *H04W 36/04* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 10,075,881 B2 * | 9/2018 | Yi | H04W 36/0072 |
| 2004/0203971 A1 | 10/2004 | Kuo | H04W 36/12 455/517 |

(Continued)

FOREIGN PATENT DOCUMENTS

| | | |
|---|---|---|
| CN | 101933364 A | 12/2010 |
| CN | 103581933 A | 2/2014 |

(Continued)

OTHER PUBLICATIONS

Research in Motion: "Discussion on Protocol Stack Support in Small Cell eNB", 3GPP TSG RAN WG2 Meeting #81, R2-130068, Jan. 28-Feb. 1, 2013.

(Continued)

*Primary Examiner* — Lonnie V Sweet
(74) *Attorney, Agent, or Firm* — Fish & Richardson P.C.

(57) ABSTRACT

The present invention relates to a wireless communication system. More specifically, the present invention relates to a method and a device for performing a cell change procedure in the wireless communication system, the method comprising: receiving configuration information indicating an identifier of a radio bearer to which a cell change procedure be performed; and performing the cell change procedure in RLC (Radio Link Control) and PDCP (Packet Data Convergence Protocol) entities of the radio bearer indicated in the configuration information, wherein the cell change procedure comprises a re-establishment of the RLC and PDCP entities.

14 Claims, 9 Drawing Sheets

Related U.S. Application Data

(60) Provisional application No. 61/807,337, filed on Apr. 2, 2013.

(56) References Cited

U.S. PATENT DOCUMENTS

| | | | | |
|---|---|---|---|---|
| 2008/0254800 | A1* | 10/2008 | Chun | H04W 36/0033 455/438 |
| 2009/0104890 | A1* | 4/2009 | Wang | H04W 12/02 455/410 |
| 2009/0175175 | A1* | 7/2009 | Somasundaram | H04L 1/1838 370/242 |
| 2009/0190554 | A1* | 7/2009 | Cho | H04L 1/1874 370/331 |
| 2009/0201881 | A1 | 8/2009 | Chun | H04J 11/0069 370/331 |
| 2009/0316664 | A1 | 12/2009 | Wu | |
| 2010/0034169 | A1 | 2/2010 | Maheshwari et al. | |
| 2011/0149905 | A1 | 6/2011 | Kim | |
| 2012/0142361 | A1 | 6/2012 | Zhao | H04W 36/28 455/446 |
| 2013/0176988 | A1 | 7/2013 | Wang | H04W 28/08 370/331 |
| 2013/0315202 | A1 | 11/2013 | May | H04W 36/0005 370/331 |
| 2014/0198734 | A1 | 7/2014 | Yamada | H04W 76/00 370/329 |
| 2014/0269632 | A1 | 9/2014 | Blankenship | H04W 76/025 370/336 |

FOREIGN PATENT DOCUMENTS

| | | |
|---|---|---|
| EP | 2480025 | 7/2012 |
| JP | 2014530538 A | 11/2014 |
| KR | 1020100108444 | 10/2010 |
| KR | 1020130004935 | 1/2013 |
| WO | 2011032497 A1 | 3/2011 |

OTHER PUBLICATIONS

LG Electronics Inc.: "Connectivity Models for Small Cell Enhancement", 3GPP TSG-RAN WG2 #81, R2-130314, Jan. 28-Feb. 1, 2013.
LG Electronics Inc.: "UP Radio Procotol for Dual Connecivity", 3GPP TSG-RAN2 Meeting #81bis, R2-131231, Apr. 15-19, 2013.
LG Electronics Inc.: "Serving Cell Handling in CA", 3GPP TSG-RAN WG2 #67bis, R2-095693, Oct. 12-16, 2009.
CATT: "Cell change in CA", 3GPP TSG RAN WG2 Meeting #67bis, R2-095481, Oct. 12-16, 2009.
3GPP TS 36.323 V11.2.0 (Mar. 2013), "3rd Generation Partnership Project; Technical Specification Group Radio Access Network; Evolved Universal Terrestrial Radio Access (E-UTRA); Packet Data Convergence Protocol (PDCP) specification (Release 11)", XP050692247.
Change Request; Media Tek: "Scell management in RRCConnectionReconfiguration", 3GPP TSG-RAN2 Meeting #71, R2-104429, Aug. 23-27, 2010.
Indian Office Action in Indian Application No. 2761KOLNP2015, dated Dec. 12, 2019, 6 pages. (with English translation).

* cited by examiner (a) contol - plane protocol stack (b) user - plane protocol stack (a) When the UE connected to MeNB moves to the area under SeNB1

(b) When the UE connected to MeNB moves from the area under SeNB1 to the area under SeNB2

(c) When the UE connected to MeNB moves out of the area under SeNB2

ND FOR PERFORMING A CELL
METHOD FOR PERFORMING A CELL CHANGE PROCEDURE IN A WIRELESS COMMUNICATION SYSTEM AND A DEVICE THEREFOR

This application is a Continuation of U.S. application Ser. No. 14/771,385 filed Aug. 28, 2015, which is a National Stage under 35 U.S.C. 371 of International Application No. PCT/KR2014/002270 filed Mar. 18, 2014, which claims the benefit of U.S. Provisional Application No. 61/807,337 filed Apr. 2, 2013, all of which are hereby incorporated by reference in their entirety.

TECHNICAL FIELD

The present invention relates to a wireless communication system and, more particularly, to a method for performing a cell change procedure and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing a cell change procedure in a wireless communication system. The technical problems solved by the present invention are not limited to the above technical problems and those skilled in the art may understand other technical problems from the following description.

Technical Solution

The object of the present invention can be achieved by providing a method for operating by an user equipment (UE) in wireless communication system, the method comprising; receiving configuration information indicating an identifier of a radio bearer to which a cell change procedure to be performed; and performing the cell change procedure in RLC (Radio Link Control) and PDCP (Packet Data Convergence Protocol) entities of the radio bearer indicated in the configuration information, wherein the cell change procedure comprises a re-establishment of the RLC and PDCP entities.

In another aspect of the present invention, provided herein is a UE (User Equipment) in the wireless communication system, the UE comprising: an RF (Radio Frequency) module; and a processor to control the RF module, wherein the processor configured to receive configuration information indicating an identifier of a radio bearer to which a cell change procedure be performed and to perform the cell change procedure in RLC (Radio Link Control) and PDCP (Packet Data Convergence Protocol) entities of the radio bearer indicated in the configuration information, wherein the cell change procedure comprises a re-establishment of the RLC and PDCP entities.

Preferably, the configuration information is indicated by the first base station on a first type cell or a second base station on a second type cell.

Preferably, the configuration information is received through a RRC signaling message.

Preferably, the PDCP entity does not change a security key when the re-establishment of the PDCP entity is performed.

Preferably, the RLC entity is released after the re-establishment of the RLC entity is performed.

Preferably, the method further comprises transmitting a PDCP status report when the RLC entity is added, changed or released.

Preferably, the PDCP status report informs that which PDCP SDUs were correctly received and which were not correctly received.

Preferably, a PDCP entity of the radio bearer and a RLC entity in a network side of the radio bearer reside on different base station.

Preferably, a RRC entity of the UE requests the PDCP entity to perform the re-establishment of the PDCP entity without changing a security key.

Preferably, a RRC entity of the UE requests the RLC entity to release after the re-establishment of the RLC entity is performed.

Advantageous Effects

According to the present invention, a cell change procedure can be efficiently performed in a wireless communication system. Specifically, a re-establishment of RLC (Radio Link Control) and PDCP (Packet Data Convergence Protocol) entities of the radio bearer can be efficiently performed in the cell change procedure.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
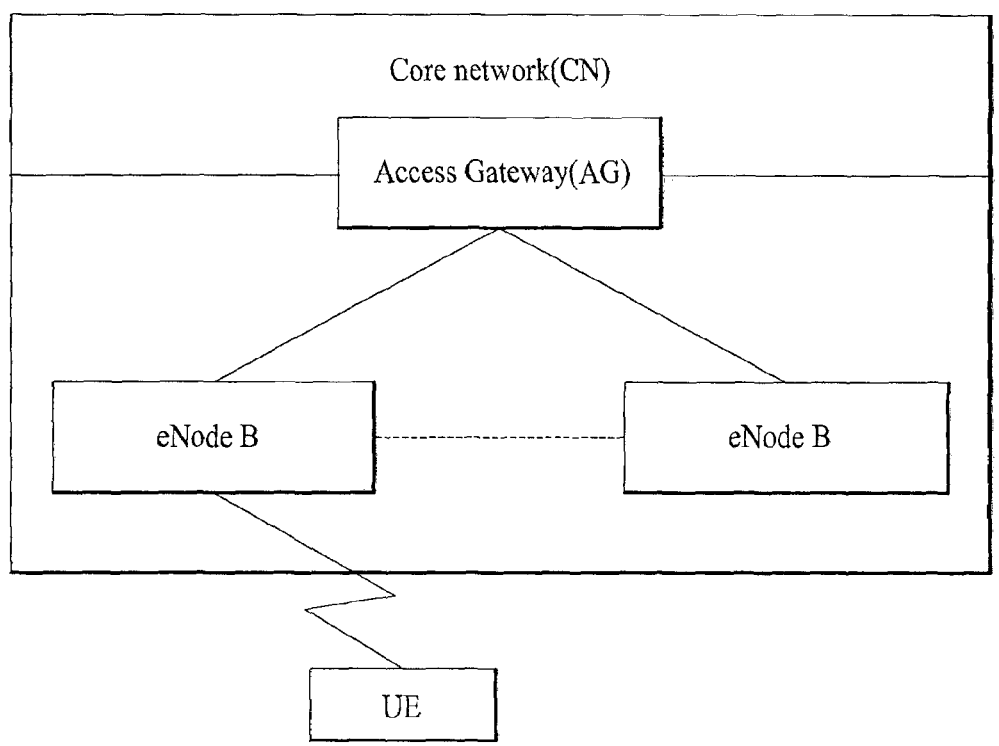
FIG. 1 is a diagram showing a network structure of an Evolved Universal Mobile Telecommunications System (E-UMTS) as an example of a wireless communication system.
Figure 2A:
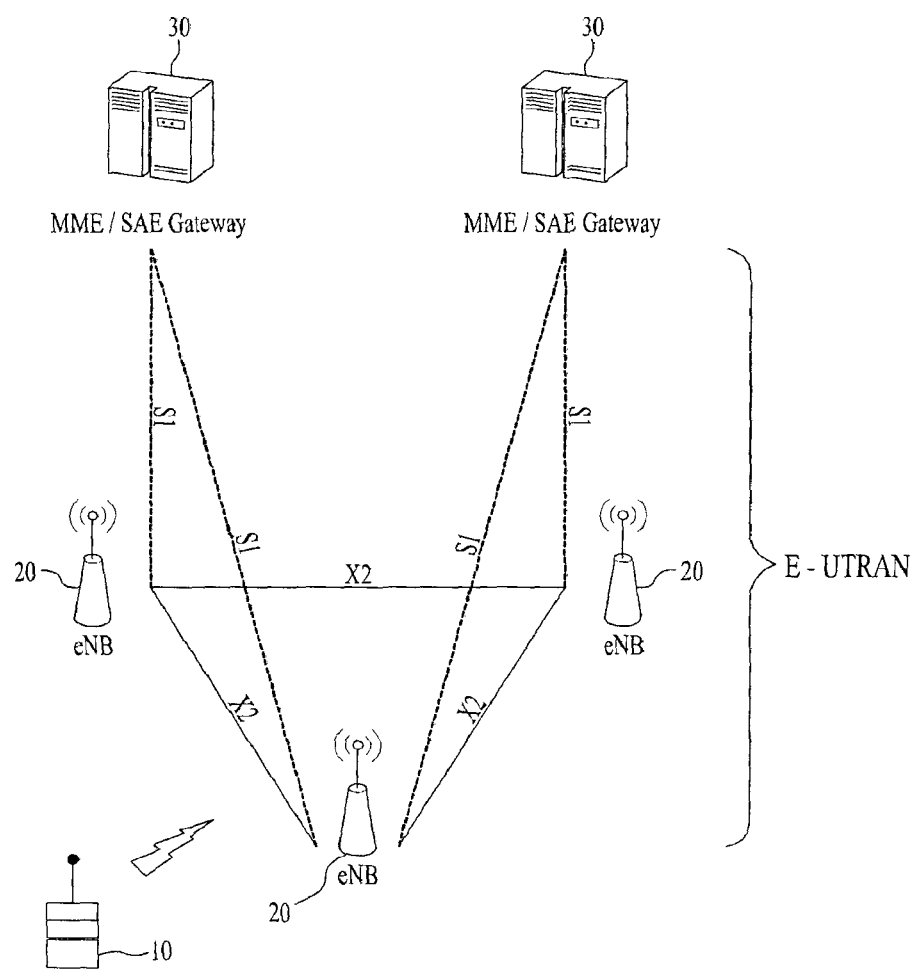
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
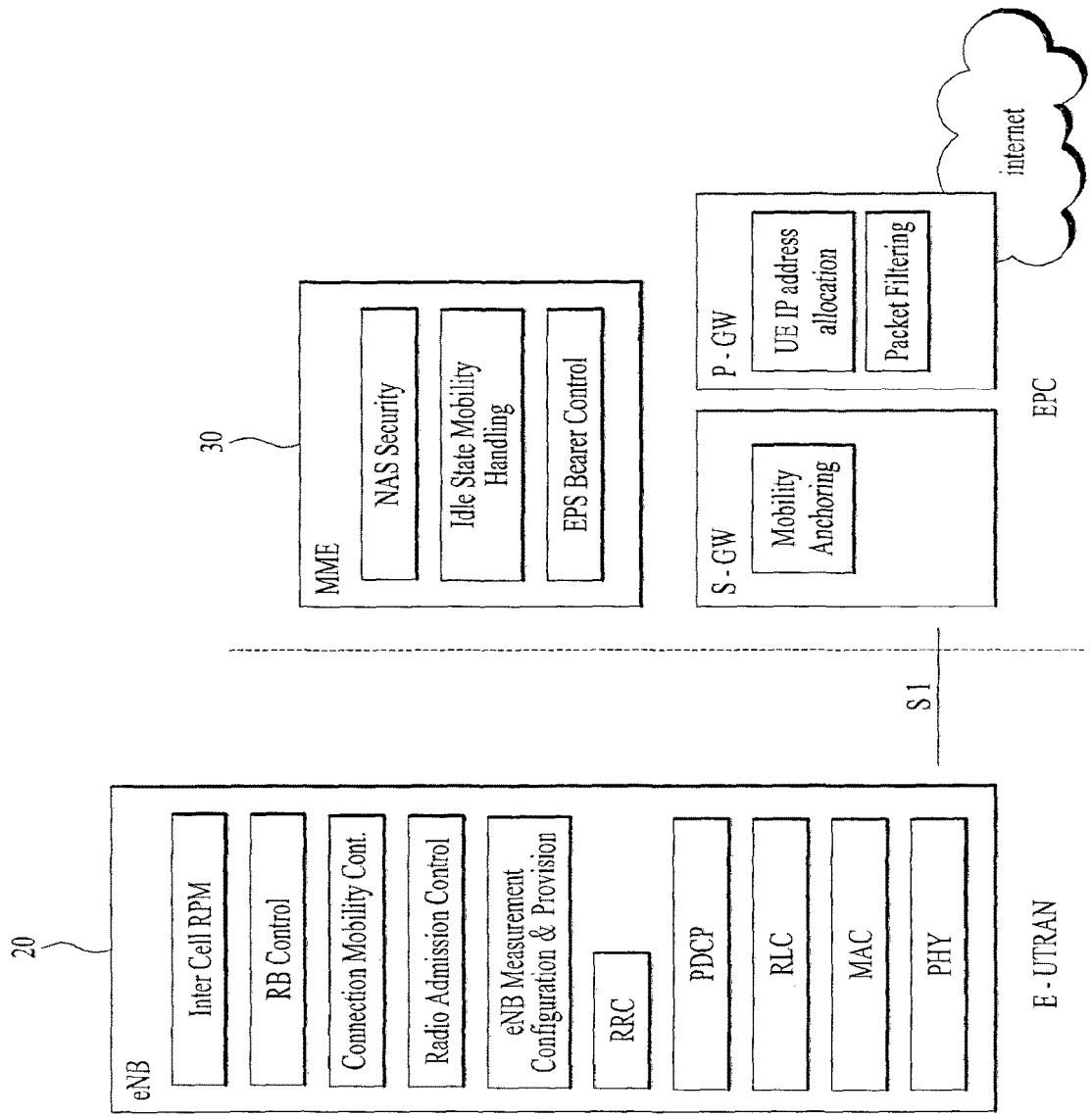
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2B is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
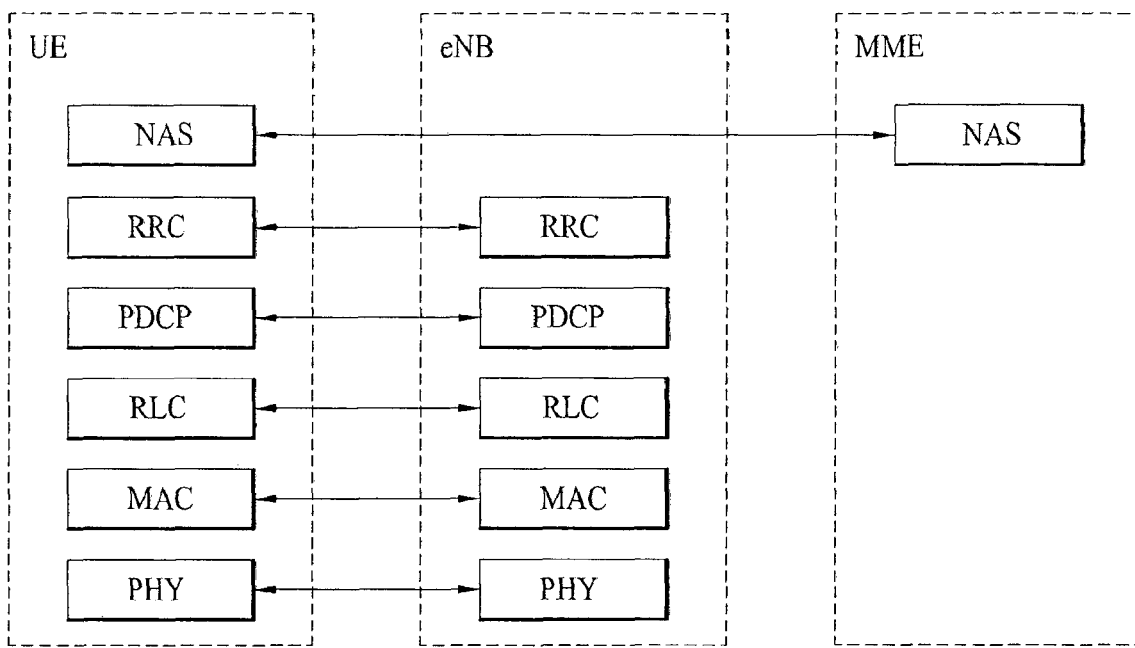
FIG. 3 is a diagram showing a control plane and a user plane of a radio interface protocol between a UE and an E-UTRAN based on a 3rd generation partnership project (3GPP) radio access network standard.
Figure 3:
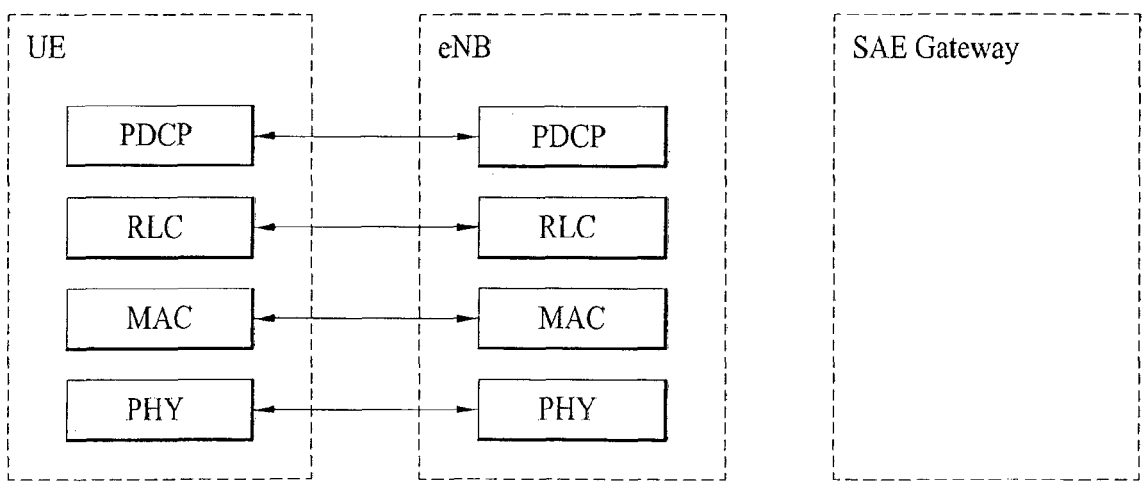

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
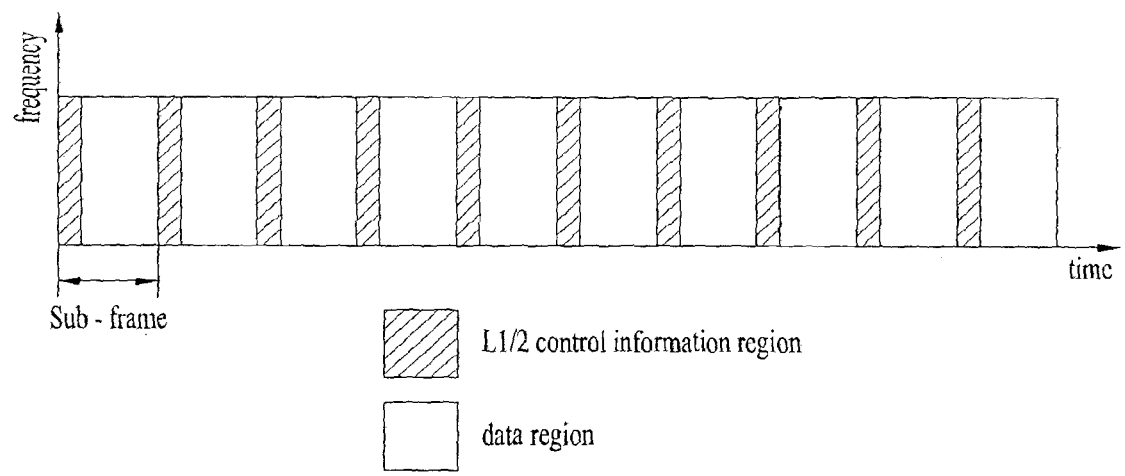
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
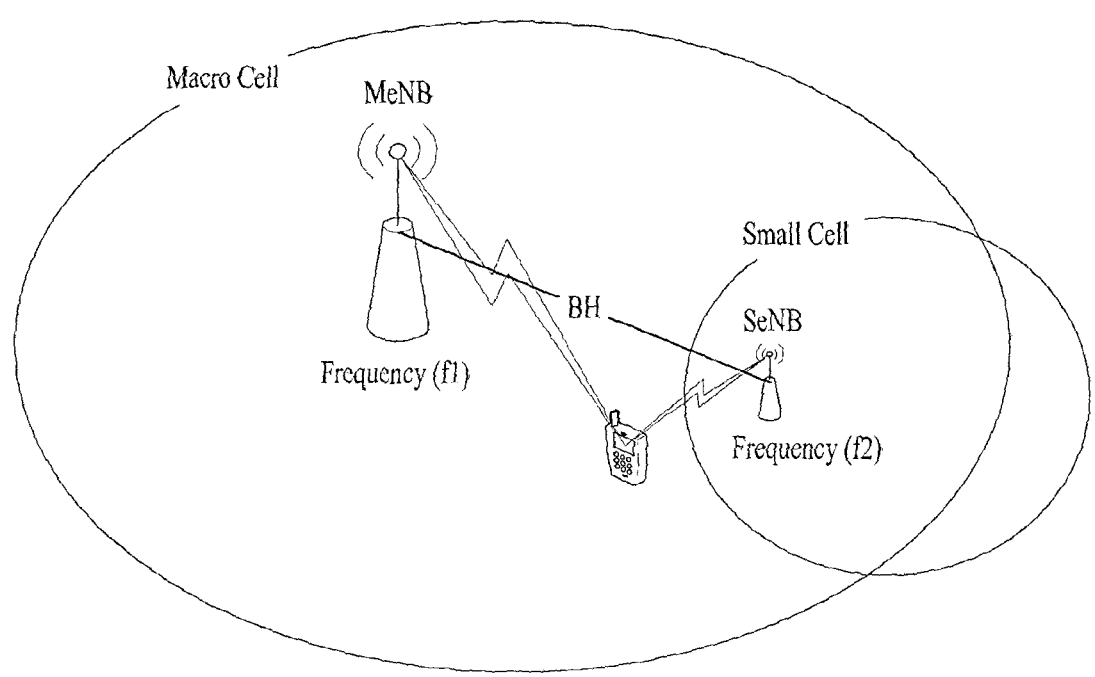
FIG. 5 is a conceptual diagram for dual connectivity between a macro cell and a small cell.

FIG. 5 is a conceptual diagram for dual connectivity between a macro cell and a small cell.

In the next system of LTE-A, a plurality of small cells (e.g., micro cell) may be present in a big cell (e.g. macro cell) having larger coverage than the small cells for optimization of data traffic, etc. For example, a macro cell and a micro cell may be combined for one user equipment (e.g. the dual connectivity). If the macro cell is used for managing mobility of the UE mainly (e.g. PCell) and the micro cell is used for boosting throughput mainly in this situation (e.g. SCell), the plurality of cells combined to the UE have different coverage each other. And each of cells can be managed by each of base stations. The base stations are geographically separated (inter-site CA).

The dual connectivity means that the UE can be connected to both the macro cell and the small cell at the same time. With dual connectivity, some of the data radio bearers (DRBs) can be offloaded to the small cell to provide high throughput while keeping scheduling radio bearers (SRBs) or other DRBs in the macro cell to reduce the handover possibility. The macro cell is operated by MeNB (Macro cell eNB) via the frequency of f1, and the small cell is operated by SeNB (Small cell eNB) via the frequency of f2. The frequency f1 and f2 may be equal. The backhaul interface between MeNB and SeNB is non-ideal, which means that there is considerable delay in the backhaul and therefore the centralized scheduling in one node is not possible.

To benefit from the dual connectivity, the best-effort traffic which is delay tolerant is offloaded to small cell while the other traffic, e.g. SRBs or real-time traffic, is still serviced by the macro cell.

Figure 6:
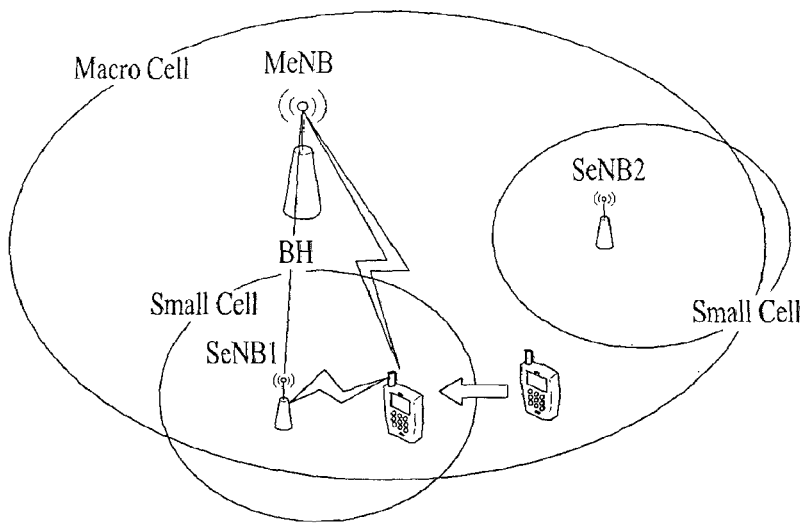
FIG. 6 is a conceptual diagram for cell changing in a dual connectivity system.
Figure 6:
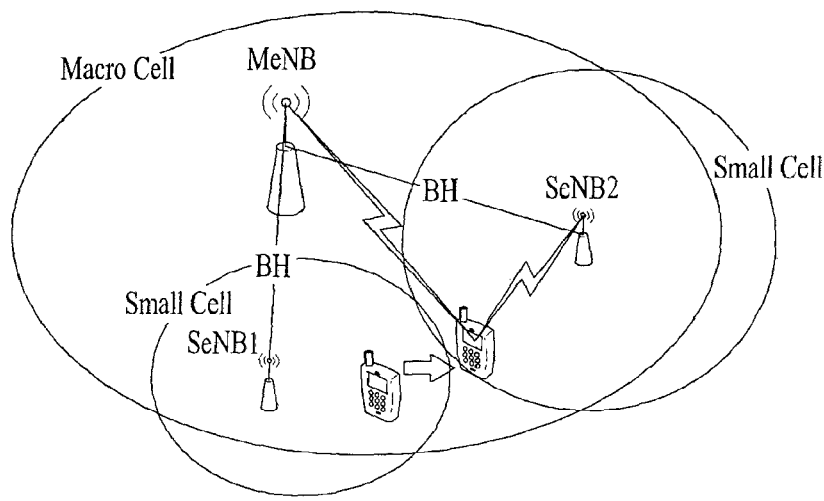
Figure 6:
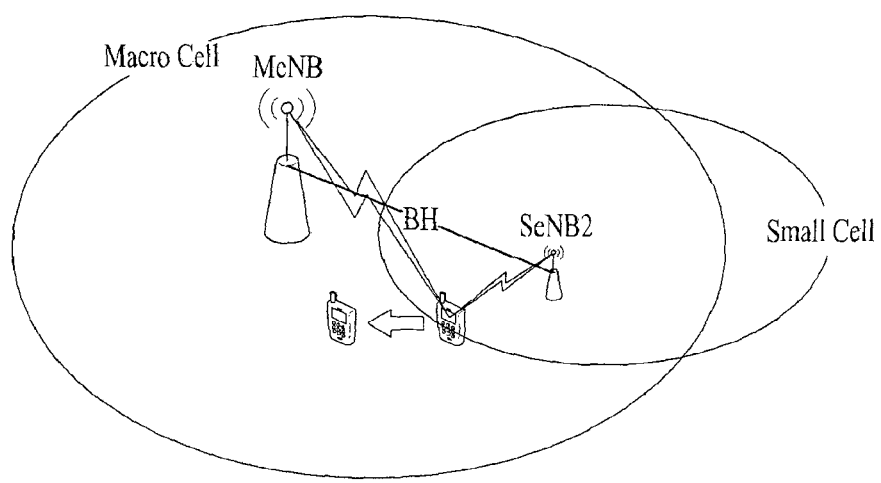

FIG. 6 is a conceptual diagram for performing a cell change procedure in a dual connectivity system.

The UE performs cell change procedure in RLC and PDCP entities when a cell is added, changed, or removed. More specially, when a certain radio bearer supporting the cell is added, changed, or removed, the UE performs the cell change procedure.

In the dual connectivity system between a macro cell and a small cell, when the small cell is added, changed, or removed, the UE performs small cell change (SCC) procedure in RLC and PDCP entities being communicating with a macro base station (MeNB). The small cell (e.g., a pico-cell, a femto-cell, etc.) can be a cell having a smaller coverage than coverage of the serving cell (e.g. macro cell). The macro base station (MeNB) is one of base stations on the macro cell coverage and serves the macro cell coverage. The small base station (SeNB) is one of base stations on the small cell coverage and serves the small cell coverage. The coverage of macro cell and the coverage of small cell have an area overlapping each other.

When the UE performs the SCC procedure, the radio bearer whose all entities of the network may reside on a small cell or only for the radio bearer whose RLC/MAC/PHY (or only RLC entity) of the network may be moved from the MeNB to the SeNB, from a SeNB 1 to another SeNB 2, or from the SeNB to the MeNB. The PDCP entity may reside on a changed cell (split bearer structure).

As shown in FIG. 6, in case of (a), when the UE connected to the MeNB moves to the area under the SeNB1, some of the DRBs, e.g. BE-DRB (Best Effort—DRB), can be offloaded to the SeNB1. In this manner, the RLC/MAC/PHY of the BE-DRB is changed from the MeNB to the SeNB1 while the PDCP entity is still maintained in the MeNB.

In case of (b), when the UE connected to the MeNB moves from the area under the SeNB1 to the area under the SeNB2, the BE-DRB served by the SeNB1 is moved to the SeNB2. In this manner, the RLC/MAC/PHY of the BE-DRB is changed from the SeNB1 to the SeNB2 while the PDCP entity is still maintained in the MeNB.

In case of (c), when the UE connected to the MeNB moves out of the area under the SeNB2, the BE-DRB served by the SeNB2 is moved to the MeNB. In this manner, the RLC/MAC/PHY of the BE-DRB is changed from the MeNB to the SeNB2 while the PDCP is still maintained in the MeNB.

Figure 7:
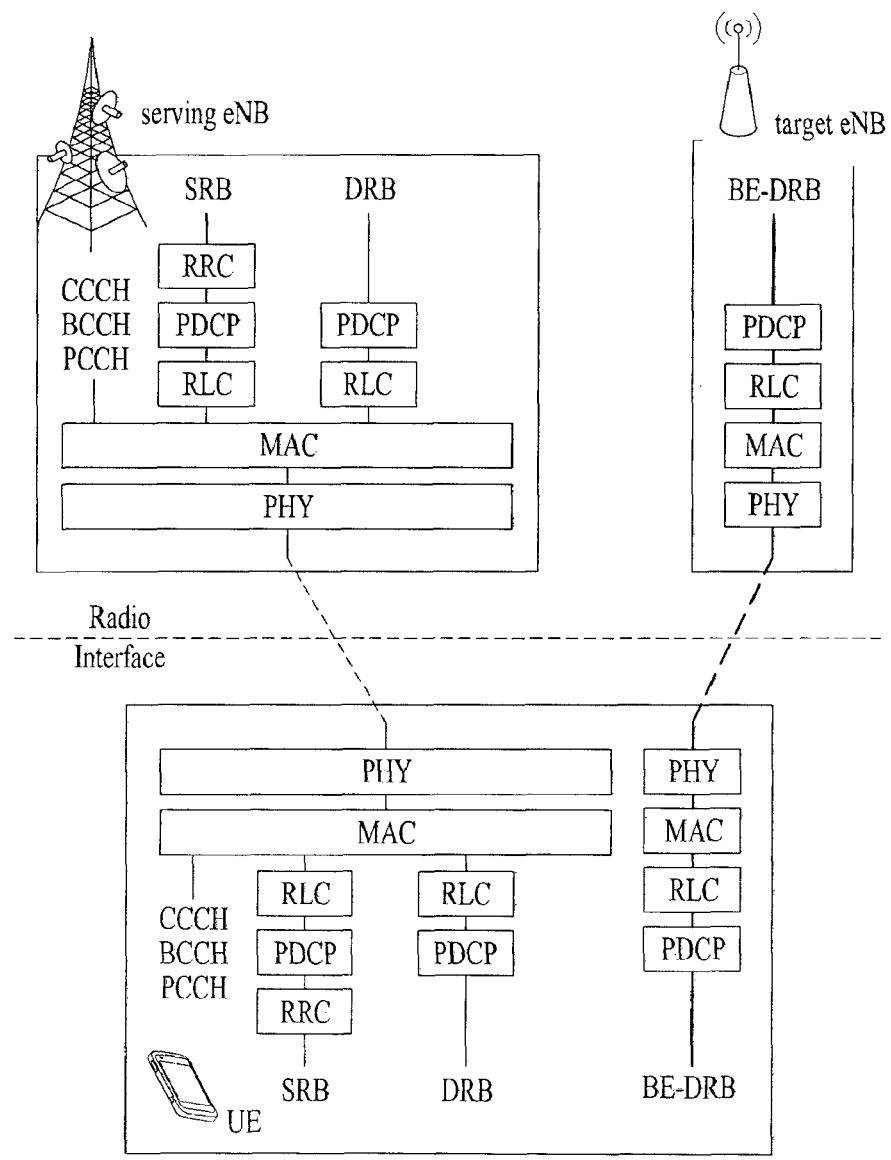
FIG. 7 is a conceptual diagram for re-establishing RLC entity and PDCP entity in a handover procedure.

FIG. 7 is a conceptual diagram for re-establishing RLC entity and PDCP entity in a handover procedure.

The PDCP entity and RLC entity are re-established during handover. The UE initiates the handover procedure when it receives a RRCConnectionReconfiguration message including mobilityControlInfo information element from the base station.

The UE may reset MAC and re-establish PDCP entity for all RBs (radio bearers) that are established. The handling of the radio bearers after the successful completion of the PDCP re-establishment, e.g. the re-transmission of unacknowledged PDCP SDUs (as well as the associated status reporting) and the handling of the SN (sequence number) and the HEN (hyper frame number).

The UE may re-establish RLC entity for all RBs (radio bearers) that are established. The UE may configure lower layers to consider the SCells (secondary cell), if configured, to be in deactivated state and apply the value of the newUE-Identity as the C-RNTI.

The UE may configure lower layers to apply the integrity protection algorithm and the $K_{RRCint}$ key, i.e. the integrity protection configuration shall be applied to all subsequent messages received and sent by the UE, including the message used to indicate the successful completion of the procedure. The UE may configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure.

If the UE connected as the RN, the UE may configure lower layers to apply the integrity protection algorithm and the $K_{UPint}$ key, for current or subsequently established DRBs that are configured to apply integrity protection.

The PDCP Re-Establishment Procedure

When upper layers request a PDCP re-establishment, the UE may additionally perform once the procedures described in this section for the corresponding RLC mode. The PDCP re-establishment procedure comprises a case of UL data transfer procedures and a case of DL data transfer procedures.

In case of UL data transfer procedures for DRBs mapped on RLC AM, when upper layers request a PDCP re-establishment, the UE may reset the header compression protocol for uplink and start with an IR state in U-mode. If the UE connected as an RN, the UE may apply the integrity protection algorithm and key provided by upper layers (if configured) during the re-establishment procedure. The UE may apply the ciphering algorithm and key provided by upper layers during the re-establishment procedure. From the first PDCP SDU for which the successful delivery of the corresponding PDCP PDU has not been confirmed by lower layers, the UE may perform retransmission or transmission of all the PDCP SDUs already associated with PDCP SNs in ascending order of the COUNT values associated to the PDCP SDU prior to the PDCP re-establishment as specified below: i) performing header compression of the PDCP SDU ii) if connected as an RN, performing integrity protection of the PDCP SDU using the COUNT value associated with this PDCP SDU iii) performing ciphering of the PDCP SDU using the COUNT value associated with this PDCP SDU iv) submitting the resulting PDCP Data PDU to lower layer.

In case of UL data transfer procedures for DRBs mapped on RLC UM, when upper layers request a PDCP re-establishment, the UE may reset the header compression protocol for uplink and start with an IR state in U-mode and if the DRB is configured with the header compression protocol and drb-ContinueROHC is not configured. The UE may set Next_PDCP_TX_SN, and TX_HFN to 0 and apply the ciphering algorithm and key provided by upper layers during the re-establishment procedure. If the UE connected as an RN, the UE may apply the integrity protection algorithm and key provided by upper layers during the re-establishment procedure. For each PDCP SDU already associated with a PDCP SN but for which a corresponding PDU has not previously been submitted to lower layers: i) considering the PDCP SDUs as received from upper layer, ii) performing transmission of the PDCP SDUs in ascending order of the COUNT value associated to the PDCP SDU prior to the PDCP re-establishment without restarting the discardTimer.

In case of UL data transfer procedures for SRBs, when upper layers request a PDCP re-establishment, the UE may set Next_PDCP_TX_SN, and TX_HFN to 0, discard all stored PDCP SDUs and PDCP PDUs and apply the ciphering and integrity protection algorithms and keys provided by upper layers during the re-establishment procedure.

In case of DL data transfer procedures for DRBs mapped on RLC AM, when upper layers request a PDCP re-establishment, the UE may process the PDCP Data PDUs that are received from lower layers due to the re-establishment of the lower layers. The UE may reset the header compression protocol for downlink, and apply the ciphering algorithm and key provided by upper layers during the re-establishment procedure. If the UE connected as an RN, the UE may apply the integrity protection algorithm and key provided by upper layers during the re-establishment procedure.

In case of DL data transfer procedures for DRBs mapped on RLC UM, when upper layers request a PDCP re-establishment, the UE may process the PDCP Data PDUs that are received from lower layers due to the re-establishment of the lower layers. The UE may reset the header compression protocol for downlink if the DRB is configured with the header compression protocol and drb-ContinueROHC is not configured, set Next_PDCP_RX_SN, and RX_HFN to 0, apply the ciphering algorithm and key provided by upper layers during the re-establishment procedure. If the UE connected as an RN, the UE may apply the integrity protection algorithm and key provided by upper layers (if configured) during the re-establishment procedure.

In case of DL data transfer procedures for SRBs, when upper layers request a PDCP re-establishment, the UE may discard the PDCP Data PDUs that are received from lower layers due to the re-establishment of the lower layers, set Next_PDCP_RX_SN, and RX_HFN to 0, discard all stored PDCP SDUs and PDCP PDUs, and apply the ciphering and integrity protection algorithms and keys provided by upper layers during the re-establishment procedure.

The RLC Re-Establishment Procedure

RLC re-establishment is performed upon request by RRC, and the function is applicable for AM, UM and TM RLC entities.

When RRC indicates that an RLC entity should be re-established, if it is a transmitting TM RLC entity, the RLC entity may discard all RLC SDUs.

If it is a receiving UM RLC entity, when possible, the RLC entity may reassemble RLC SDUs from UMD PDUs with SN<VR(UH), remove RLC headers when doing so and deliver all reassembled RLC SDUs to upper layer in ascending order of the RLC SN, if not delivered before and discard all remaining UMD PDUs.

If it is a transmitting UM RLC entity, the RLC entity may discard all RLC SDUs.

If it is an AM RLC entity, when possible, the RLC entity may reassemble RLC SDUs from any byte segments of AMD PDUs with SN<VR(MR) in the receiving side, remove RLC headers when doing so and deliver all reassembled RLC SDUs to upper layer in ascending order of the RLC SN, if not delivered before. And the RLC entity may discard the remaining AMD PDUs and byte segments of AMD PDUs in the receiving side, discard all RLC SDUs and AMD PDUs in the transmitting side, discard all RLC control PDUs. And then, the RLC may stop and reset all timers and reset all state variables to their initial values.

During the handover procedure, both PDCP and RLC entities are re-established at handover in order to minimize the packet loss. However, in cases of the above three cell change procedure like FIG. 6, there is no such re-establishment because they are not considered as the handover procedure, e.g. PDCP is still maintained in the MeNB. Therefore, there should be a special mechanism to minimize the packet loss specific to "cell change procedure" case because there may be loss of packets due to the change of RLC entities in the cell change procedure.

Figure 8:
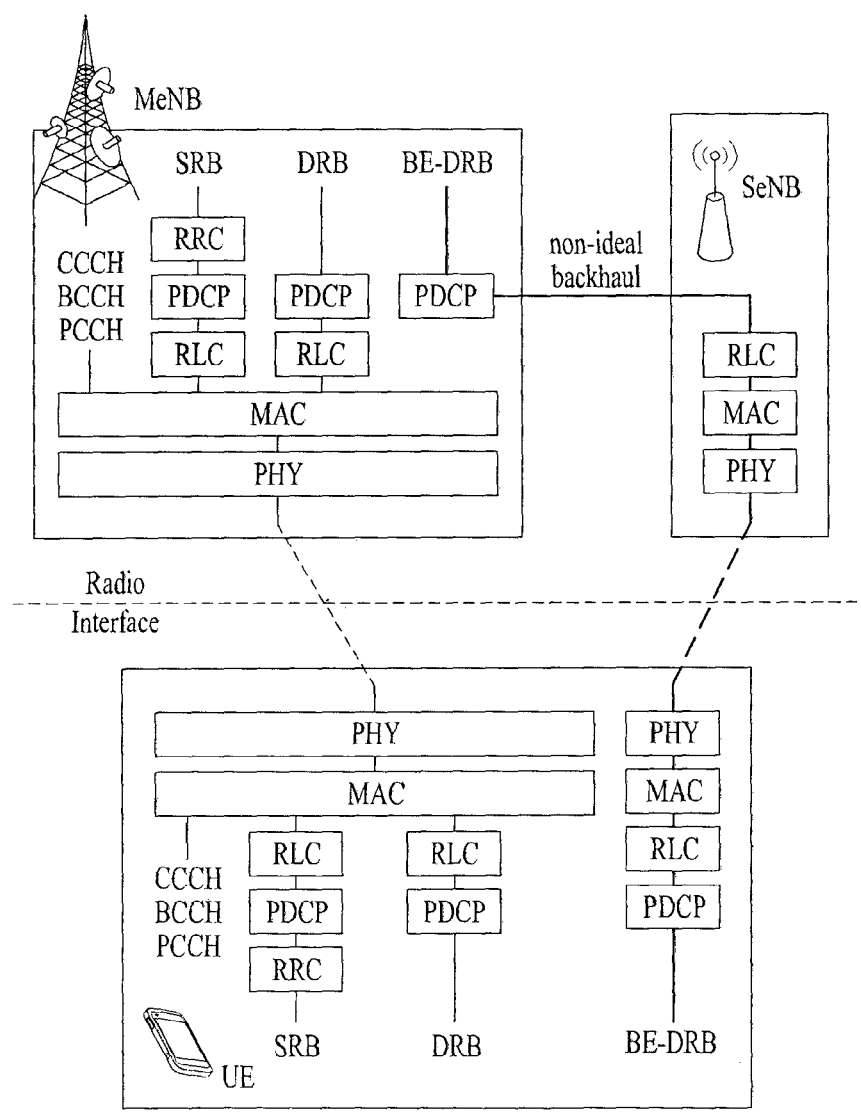
FIG. 8 is a conceptual diagram for re-establishing RLC entity and PDCP entity in a cell change according to embodiments of the present invention.

FIG. 8 is a conceptual diagram for re-establishing RLC entity and PDCP entity in a cell change procedure according to embodiments of the present invention.

When the UE receives this message, the RRC requests the PDCP and the RLC of the indicated radio bearers to perform the cell change procedure. Then, the requested PDCP and RLC entities perform the cell change procedure as follows.

The Cell Change Procedure in the RLC Entity Includes the Following Behavior.

If it is a transmitting TM RLC entity, the UE may discard all RLC SDUs. If it is a receiving UM RLC entity, when possible, the UE may reassemble RLC SDUs from UMD PDUs with SN<VR(UH), remove RLC headers when doing so and deliver all reassembled RLC SDUs to upper layer in ascending order of the RLC SN, if not delivered before. And the UE may discard all remaining UMD PDUs.

If it is a transmitting UM RLC entity, the UE may discard all RLC SDUs. If it is an AM RLC entity, when possible, the UE may reassemble RLC SDUs from any byte segments of AMD PDUs with SN<VR(MR) in the receiving side, remove RLC headers when doing so and deliver all reassembled RLC SDUs to upper layer in ascending order of the RLC SN, if not delivered before. And the UE may discard the remaining AMD PDUs and byte segments of AMD PDUs in the receiving side, discard all RLC SDUs and AMD PDUs in the transmitting side, discard all RLC control PDUs. And then the UE may stop and reset all timers and reset all state variables to their initial values.

The Cell Change Procedure in the PDCP Entity Includes the Following Behavior.

In case of PDCP transmitting side procedure for DRBs mapped on RLC AM, the UE may reset the header compression protocol for uplink and start with an IR state in U-mode. From the first PDCP SDU for which the successful delivery of the corresponding PDCP PDU has not been confirmed by lower layers, the UE may perform retransmission or transmission of all the PDCP SDUs already associated with PDCP SNs in ascending order of the COUNT values associated to the PDCP SDU prior to the PDCP of the cell change procedure as specified below: i) performing header compression of the PDCP SDU, ii) performing ciphering of the PDCP SDU using the COUNT value associated with this PDCP and iii) submitting the resulting PDCP Data PDU to lower layer.

In case of PDCP transmitting side procedure for DRBs mapped on RLC UM, the UE may reset the header compression protocol for uplink and start with an IR state in U-mode if the DRB is configured with the header compression protocol and drb-ContinueROHC is not configured. The UE may set Next_PDCP_TX_SN, and TX_HFN to 0. For each PDCP SDU already associated with a PDCP SN but for which a corresponding PDU has not previously been submitted to lower layers, the UE may consider the PDCP SDUs as received from upper layer and perform transmission of the PDCP SDUs in ascending order of the COUNT value associated to the PDCP SDU prior to the PDCP of the cell change procedure, without restarting the discardTimer.

In case of PDCP transmitting side procedure for SRBs, the UE may set Next_PDCP_TX_SN, and TX_HFN to 0 and discard all stored PDCP SDUs and PDCP PDUs.

In case of PDCP receiving side procedure for DRBs mapped on RLC AM, the UE may process the PDCP Data PDUs that are received from lower layers due to the RLC of cell change procedure. If received PDCP SN−Last_Submitted_PDCP_RX_SN>Reordering_Window or 0<=Last_Submitted_PDCP_RX_SN−received PDCP SN<Reordering_Window, and if received PDCP SN>Next_PDCP_RX_SN, the UE may decipher the PDCP PDU, using COUNT based on RX_HFN−1 and the received PDCP SN or decipher the PDCP PDU, using COUNT based on RX_HFN and the received PDCP SN. And then the UE may perform header decompression and discard this PDCP SDU.

Else if Next_PDCP_RX_SN−received PDCP SN>Reordering_Window, the UE may increment RX_HFN by one, use COUNT based on RX_HFN and the received PDCP SN for deciphering the PDCP PDU and set Next_PDCP_RX_SN to the received PDCP SN+1.

If the UE received PDCP SN−Next_PDCP_RX_SN>=Reordering_Window, the UE may use COUNT based on RX_HFN−1 and the received PDCP SN for deciphering the PDCP PDU.

If the UE received PDCP SN>−Next_PDCP_RX_SN, the UE may use COUNT based on RX_HFN and the received PDCP SN for deciphering the PDCP PDU, set Next_PDCP_RX_SN to the received PDCP SN+1. And if Next_PDCP_RX_SN is larger than Maximum PDCP_SN, the UE may set Next_PDCP_RX_SN to 0 and increment RX_HFN by one. If received PDCP SN<Next_PDCP_RX_SN, the UE may use COUNT based on RX_HFN and the received PDCP SN for deciphering the PDCP PDU. If the PDCP PDU has not been discarded in the above, the UE perform deciphering and header decompression (if configured) for the PDCP PDU. And if a PDCP SDU with the same PDCP SN is stored, the UE may discard this PDCP SDU or store the PDCP SDU.

If the PDCP PDU received by PDCP is not due to the RLC SCC procedure, the UE may deliver to upper layers in ascending order of the associated COUNT value. All stored PDCP SDU(s) with an associated COUNT value less than the COUNT value associated with the received PDCP SDU or all stored PDCP SDU(s) with consecutively associated COUNT value(s) starting from the COUNT value associated with the received PDCP SDU. The UE may set Last_Submitted_PDCP_RX_SN to the PDCP SN of the last PDCP SDU delivered to upper layers. If received PDCP SN=Last_Submitted_PDCP_RX_SN+1 or received PDCP SN=Last_Submitted_PDCP_RX_SN−Maximum PDCP_SN, the UE may deliver to upper layers in ascending order of the associated COUNT value and all stored PDCP SDU(s) with consecutively associated COUNT value(s) starting from the COUNT value associated with the received PDCP SDU. The UE may set. Last_Submitted_PDCP_RX_SN to the PDCP SN of the last PDCP SDU delivered to upper layers. And then, the UE may reset the header compression protocol for downlink.

In case of PDCP receiving side procedure for DRBs mapped on RLC UM, the UE may process the PDCP Data PDUs that are received from lower layers due to RLC of the cell change procedure.

If received PDCP SN<Next_PDCP_RX_SN, the UE may increment RX_HFN by one. The UE may decipher the PDCP Data PDU using COUNT based on RX_HFN and the received PDCP SN, set Next_PDCP_RX_SN to the received PDCP SN+1. If Next_PDCP_RX_SN>Maximum PDCP SN, the UE may set Next_PDCP_RX_SN to 0, and increment RX_HFN by one. The UE may perform header decompression (if configured) of the deciphered PDCP Data PDU and deliver the resulting PDCP SDU to upper layer. The UE may reset the header compression protocol for downlink if the DRB is configured with the header compression protocol and drb-ContinueROHC is not configured and set Next_PDCP_RX_SN, and RX_HFN to 0.

In case of PDCP receiving side procedure for SRBs, the UE may discard the PDCP Data PDUs that are received from lower layers due to the RLC SCC procedure, set Next_PDCP_RX_SN, and RX_HFN to 0 and discard all stored PDCP SDUs and PDCP PDUs.

The RLC and PDCP entities in the network side also perform the above behaviors at the cell change procedure. The PDCP of cell change procedure is performed by the PDCP entity in the MeNB. But the RLC of cell change procedure is performed by the RLC entity in the old base station that will be removed (or not used) after the cell change procedure performed. For example, if the path of a DRB is changed from the MeNB to a SeNB, the RLC entity in the MeNB may perform the above RLC of cell change procedure, and then is removed.

The cell change procedure can be seen as a modified re-establishment procedure. The difference is that the Security Key is not changed in the PDCP of cell change procedure while it is changed in the PDCP re-establishment procedure, and the RLC entity is removed after the RLC SCC procedure but it is maintained after the RLC re-establishment procedure. Therefore, the RRC can request the PDCP to perform the re-establishment procedure without applying the new Security Key, and request the RLC to perform the re-establishment procedure and then release.

After the cell change procedure is performed, the PDCP receiving side transmits PDCP status report to the PDCP transmitting side to inform that which PDCP SDUs were correctly received and which were not correctly received. It means that the PDCP status report is triggered by the cell change procedure. When the PDCP transmitting side receives the PDCP status report, the PDCP transmitting side retransmits the PDCP SDUs that have not been correctly received by the PDCP receiving side.

Figure 9:
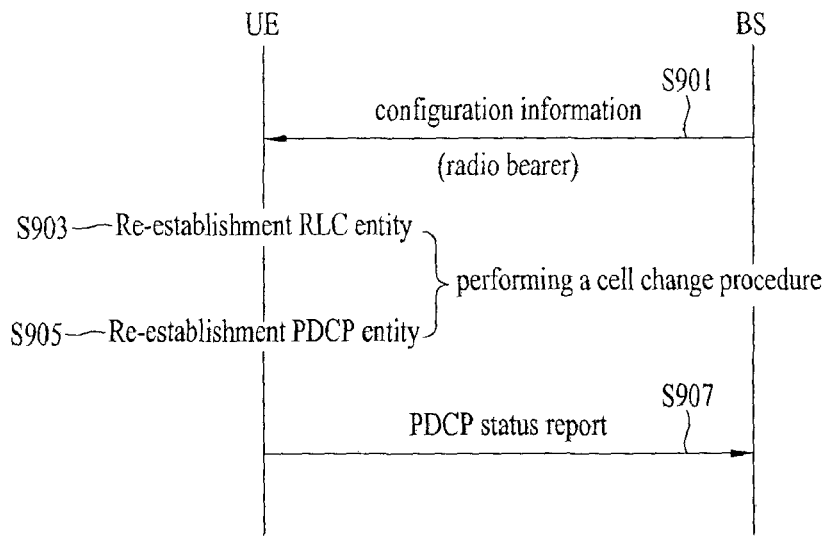
FIG. 9 is a conceptual diagram for performing a cell change according to embodiments of the present invention.

FIG. 9 is a conceptual diagram for performing a cell change procedure according to embodiments of the present invention.

The UE receives configuration information indicating an identifier of a radio bearer to which the cell change procedure to be performed (S901). The cell change procedure is performed when the serving cell needs to offload data to a target cell during connecting with the UE.

Desirably, the serving cell may indicate a request of performing the cell change procedure using a certain indicator. Or, the UE may perform the cell change procedure itself when a certain condition is met.

The configuration information may be indicated by the macro base station on a macro cell or a small base station on a small cell. The small cell (e.g., a pico-cell, a femto-cell, etc.) can be a cell having a smaller coverage than coverage of the serving cell (e.g. macro cell). The macro base station (MeNB) is one of base stations on the macro cell coverage and serves the macro cell coverage. The small base station (SeNB) is one of base stations on the small cell coverage and serves the small cell coverage. The coverage of macro cell and the coverage of small cell have an area overlapping each other. The configuration information is received through RRC signaling message. When the UE receives the configuration information, the UE may perform the cell change procedure in RLC (Radio Link Control) and PDCP (Packet Data Convergence Protocol) entities of the radio bearer indicated in the configuration information (S903~S905). The cell change procedure may comprise a re-establishment of the RLC and PDCP entities.

Desirably, in case of the re-establishment of the RLC entity (S903), the UE may release the RLC entity after the re-establishment of the RLC entity is performed.

Desirably, in case of the re-establishment of the PDCP entity (S905), the UE may performed the re-establishment of the PDCP entity in the macro base station the re-establishment of the PDCP entity is performed without applying a new security key.

The UE transmits a PDCP status report when the RLC entity is added, changed or released (S907). When upper layers request a PDCP re-establishment, for radio bearers that are mapped on RLC AM, if the radio bearer is configured by upper layers to send a PDCP status report in the uplink, the UE may compile a status report as indicated below after processing the PDCP Data PDUs that are received from lower layers due to the re-establishment of the lower layers, and submit it to lower layers as the first PDCP PDU for the transmission by setting the FMS field to the PDCP SN of the first missing PDCP SDU.

If there is at least one out-of-sequence PDCP SDU stored, the UE may submit it to lower layers as the first PDCP PDU for the transmission by allocating a Bitmap field of length in bits equal to the number of PDCP SNs from and not including the first missing PDCP SDU up to and including the last out-of-sequence PDCP SDUs, rounded up to the next multiple of 8, the PDCP report may set as '0' in the corresponding position in the bitmap field for all PDCP SDUs that have not been received as indicated by lower layers, and optionally PDCP SDUs for which decompression have failed, and indicating in the bitmap field as '1' for all other PDCP SDUs.

Figure 10:
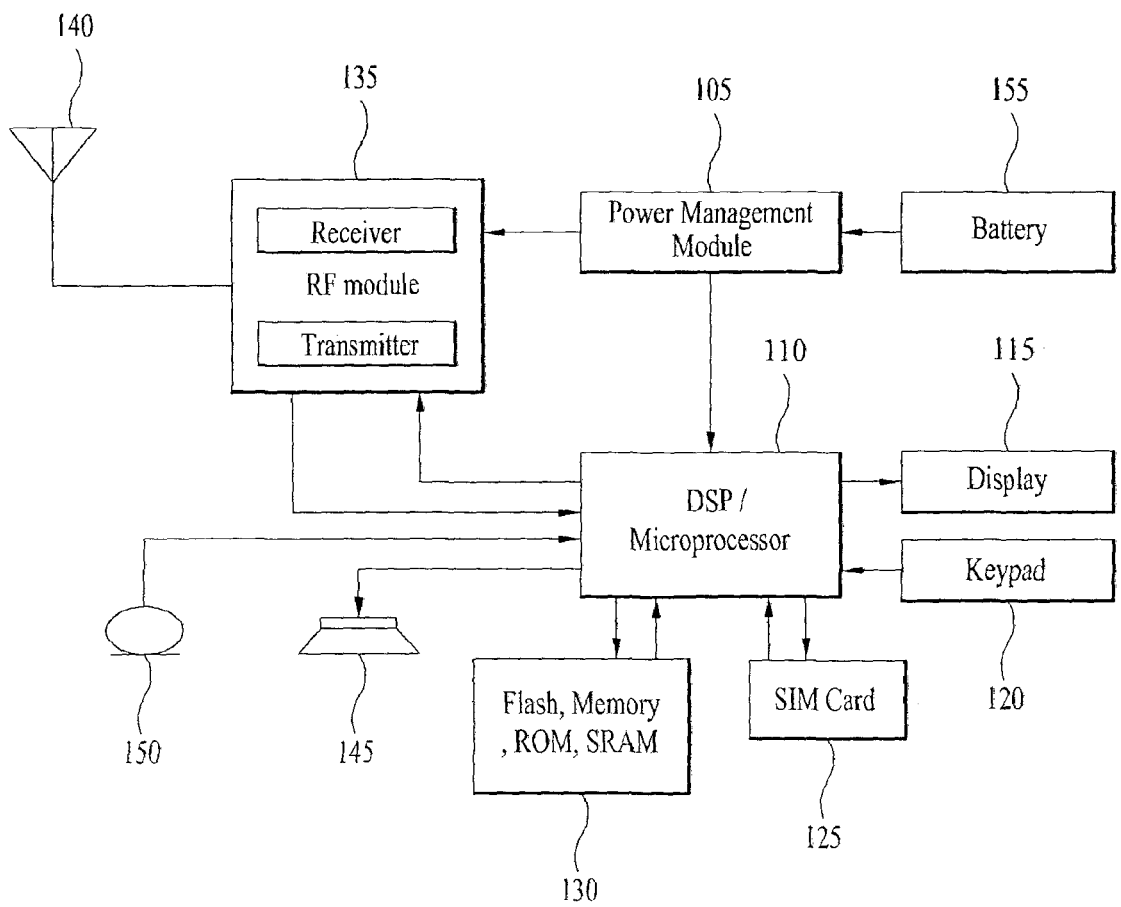
FIG. 10 is a block diagram of a communication apparatus according to an embodiment of the present invention.

FIG. 10 is a block diagram of a communication apparatus according to an embodiment of the present invention.

The apparatus shown in FIG. 10 can be a user equipment (UE) and/or eNB adapted to perform the above mechanism, but it can be any apparatus for performing the same operation.

As shown in FIG. 10, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 10 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 10 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method of performing a reestablishment procedure by an apparatus in a communication system supporting dual connectivity, the method comprising:
receiving a Radio Resource Control (RRC) message comprising information regarding an identifier of a radio bearer;
based on a first RRC request to perform a Radio Link Control (RLC) reestablishment, performing an RLC reestablishment procedure for the radio bearer, wherein the RLC reestablishment procedure comprises (i) stopping and resetting RLC-related timers, and (ii) resetting RLC-related state variables to their initial values; and
based on a second RRC request to perform a modified Packet Data Convergence Protocol (PDCP) reestablishment, performing a modified PDCP reestablishment procedure for the radio bearer, wherein the modified PDCP reestablishment procedure comprises:
maintaining, relative to before performing the modified PDCP reestablishment procedure, a PDCP-related security key; and
performing one of (i) retransmission, through at least one RF module, of PDCP data units for which successful delivery has not been confirmed, or (ii) transmission, through the at least one RF module, of a PDCP status report.

2. The method of claim 1, further comprising:
based on a third RRC request to perform PDCP reestablishment, performing a PDCP reestablishment procedure for the radio bearer,
wherein the PDCP reestablishment procedure comprises configuring, relative to before performing the PDCP reestablishment procedure, a new PDCP-related security key.

3. The method of claim 1, wherein the PDCP-related security key is related to integrity protection or ciphering.

4. The method of claim 2, wherein the radio bearer corresponds to a first type radio bearer established such that a radio protocol of the first type radio bearer is located in either a master base station or a secondary base station, based on the third RRC request to perform the PDCP reestablishment for the radio bearer.

5. The method of claim 1, wherein the radio bearer corresponds to a second type radio bearer established such that a radio protocol of the second type radio bearer is located in both a master base station and a secondary base station, based on the second RRC request to perform the modified PDCP reestablishment for the radio bearer.

6. The method of claim 1, wherein receiving the RRC message is performed by an RRC entity of the apparatus,
wherein the first RRC request to perform the RLC reestablishment is requested by the RRC entity to an RLC entity of the apparatus, and
wherein the second RRC request to perform the modified PDCP reestablishment is requested by the RRC entity to a PDCP entity of the apparatus.

7. The method of claim 6, wherein the first RRC request to perform the RLC reestablishment and the second RRC request to perform the modified PDCP reestablishment is requested by the RRC entity when a cell change happens.

8. An apparatus configured to perform a reestablishment procedure in a communication system supporting dual connectivity, the apparatus comprising:
at least one radio frequency (RF) module;
at least one processor; and
at least one computer memory operably connectable to the at least one processor and storing instructions that, when executed, cause the at least one processor to perform operations comprising:
receiving a Radio Resource Control (RRC) message comprising information regarding an identifier of a radio bearer;
based on a first RRC request to perform a Radio Link Control (RLC) reestablishment, performing an RLC reestablishment procedure for the radio bearer, wherein the RLC reestablishment procedure comprises (i) stopping and resetting RLC-related timers, and (ii) resetting RLC-related state variables to their initial values; and
based on a second RRC request to perform a modified Packet Data Convergence Protocol (PDCP) reestablishment, performing a modified PDCP reestablishment procedure for the radio bearer, wherein the modified PDCP reestablishment procedure comprises:
maintaining, relative to before performing the modified PDCP reestablishment procedure, a PDCP-related security key; and
performing one of (i) retransmission, through the at least one RF module, of PDCP data units for which successful delivery has not been confirmed, or (ii) transmission, through the at least one RF module, of a PDCP status report.

9. The apparatus of claim 8, wherein the operations further comprise:
  based on a third RRC request to perform PDCP reestablishment, performing a PDCP reestablishment procedure for the radio bearer,
  wherein the PDCP reestablishment procedure comprises configuring, relative to before performing the PDCP reestablishment procedure, a new PDCP-related security key.

10. The apparatus of claim 8, wherein the PDCP-related security key is related to integrity protection or ciphering.

11. The apparatus of claim 9, wherein the radio bearer corresponds to a first type radio bearer established such that a radio protocol of the first type radio bearer is located in either a master base station or a secondary base station, based on the third RRC request to perform the PDCP reestablishment for the radio bearer.

12. The apparatus of claim 8, wherein the radio bearer corresponds to a second type radio bearer established such that a radio protocol of the second type radio bearer is located in both a master base station and a secondary base station, based on the second RRC request to perform the modified PDCP reestablishment for the radio bearer.

13. The apparatus of claim 8, wherein receiving the RRC message is performed by an RRC entity of the apparatus,
  wherein the first RRC request to perform the RLC reestablishment is requested by the RRC entity to an RLC entity of the apparatus, and
  wherein the second RRC request to perform the modified PDCP reestablishment is requested by the RRC entity to a PDCP entity of the apparatus.

14. The apparatus of claim 13, wherein the first RRC request to perform the RLC reestablishment and the second RRC request to perform the modified PDCP reestablishment is requested by the RRC entity when a cell change happens.

\* \* \* \* \*